July 30, 1935.  J. S. PECKER  2,009,703

AIRCRAFT SUSTAINING ROTOR

Filed July 14, 1931  2 Sheets-Sheet 1

INVENTOR
Joseph S. Pecker
BY
ATTORNEYS

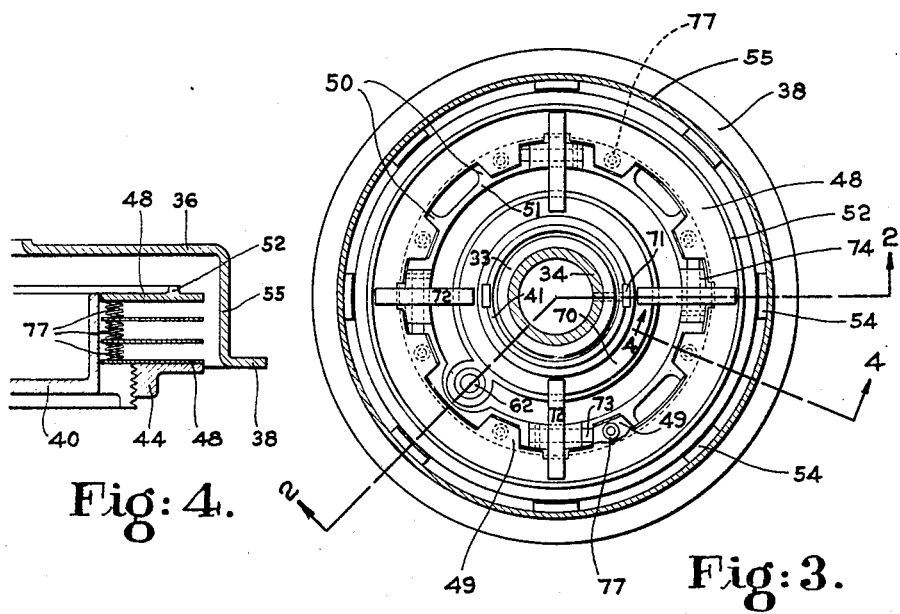
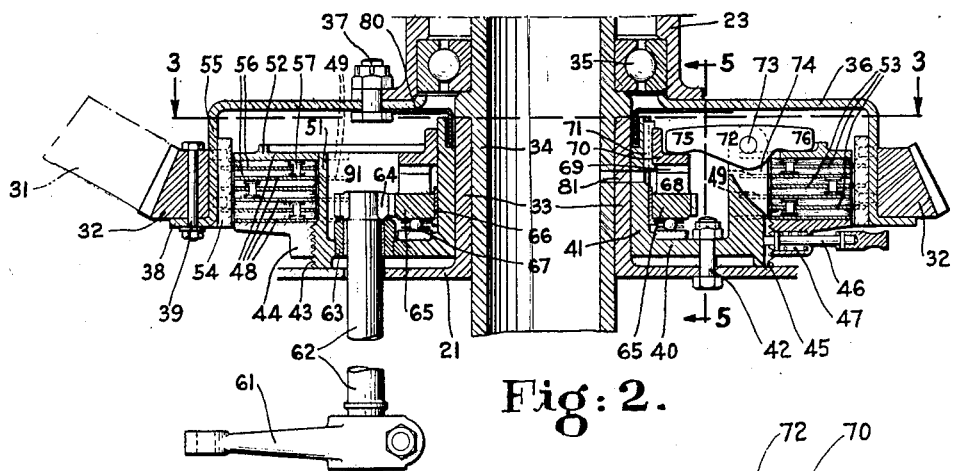
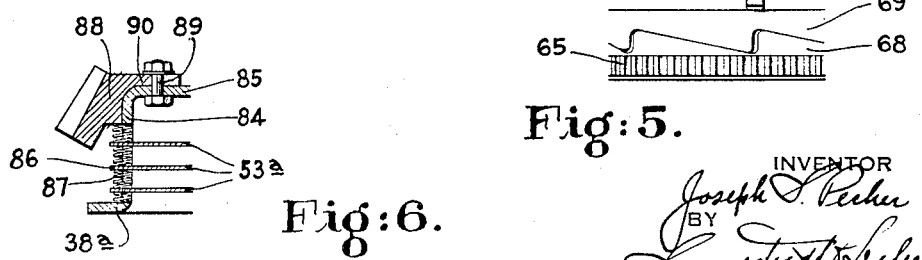

Patented July 30, 1935

2,009,703

UNITED STATES PATENT OFFICE 2,009,703

AIRCRAFT SUSTAINING ROTOR

Joseph S. Pecker, Philadelphia, Pa., assignor to Autogiro Company of America, Philadelphia, Pa., a corporation of Delaware Application July 14, 1931, Serial No. 550,658

7 Claims. (Cl. 188—72)

This invention relates to aircraft sustaining rotors, especially that type of sustaining rotors which embodies a plurality of blades or wings which are articulated to a central and upwardly directed axis mechanism for normal actuation under the influence of relative airflow.

The invention, furthermore, is more particularly concerned with the construction of the rotor hub or head itself, including a novel arrangement of rotor brake and mechanical rotor starter parts.

One of the more important objects of the invention is the provision, in a rotor head, of a rotor brake having relatively great braking capacity without unduly enlarging or complicating the structure. The present invention, therefore, has in view a construction in which effective or large braking force is obtained and, at the same time, the structural and aerodynamic efficiency of the craft in general, and the rotor head in particular, are enhanced.

Still more particularly, this invention makes provision for the mounting of a multiple disk brake unit within a drum-like structure which is associated with a rotating axis part, so that adequate protection of braking parts, from moisture, dirt and the like, is afforded.

More specifically, it is also an object of the invention to provide a rotor brake of greatly increased power and effectiveness, so that air-driven rotors of substantial size and capacity may be brought to a standstill promptly after landing even though a stiff wind be blowing upon the rotating blades; and further, the adaptation of such a high capacity brake to existing brake-drum and starter drive parts of small diameter, little or no change being needed to mount my improved brake in exisiting equipment.

In addition to the foregoing, the present invention contemplates utilization of the brake enclosing and protecting drum as a portion of the driving mechanism of a mechanical rotor starter, through which torque is transmitted preferably from the forward propulsion unit of the craft, to the rotatable axis or hub part; and this in a novel manner, by which the drum is subjected only to the transmission of torque (driving torque from the outside and braking torque from the inside), expansive forces upon the drum periphery being eliminated.

Some of the more or less detailed objects and advantages herein contemplated include a novel arrangement of annular brake disks arranged concentrically of the rotor axis and positioned to operatively react against each other by relative vertical movement.

The brake operating, controlling, and adjusting mechanism herein disclosed is also advantageous, especially in the installation of such parts in an aircraft sustaining rotor head, it being noted that the controlling or operating parts and the like are arranged generally radially inwardly of the annular brake disks so that the total space occupied by the brake unit as a whole is kept at a minimum. It should also be observed that the arrangement of the controlling mechanism is such as to neatly cooperate with the rotor head supporting or mounting structure, with the result that a brake operating connection may readily be extended downwardly from the rotor head into a cockpit of the craft.

This invention also has in view the disposition of the various brake disks, mounting parts and adjusting and control mechanism, just above a rotor pylon or mounting structure but below rotating axis parts. In addition to compactness and reduction of weight obtained by this general arrangement, the structure is such that the rotor head proper, including the rotatable hub and the drum which is carried thereby, may be removed from the rotor mount, as a unit, leaving the braking parts themselves, including the cooperating and interleaving annular disks, undisturbed, in their proper relative positions, at the top of the rotor pylon.

The construction of the present invention also provides for the stationary mounting of a major portion of brake parts, so that the number and weight of parts which rotate with the rotor is reduced to a minimum.

The brake operating mechanism herein disclosed is also of a novel arrangement generally and is such as to cooperate in an especially desirable manner with a sustaining rotor head, it being noted that, particularly where a multiple disk brake is to be associated with a rotor head, rather unusual problems arise by virtue of the necessity for keeping the total structure within small over-all dimensions as well as total weight. In addition, it might be observed, the disposition of such a disk brake in association with a sustaining rotor head has heretofore presented certain problems and difficulties with respect to the extension of the control for the brake from a cockpit of the craft to the braking disks themselves. The control structure herein disclosed is especially adapted to meet the requirements of aircraft sustaining rotors in the respect just noted, as will appear more clearly as this description proceeds.

A still further object of this invention resides in the provision of means for keeping excess or overflow lubricant, discharged from the main rotor bearings, away from the effective braking surfaces of the annular disks hereinbefore referred to. The arrangement provides for the discharge of such excess lubricant into a lubricant reservoir preferably serving to lubricate at least some of the brake actuating mechanism. From this reservoir an overflow is provided centrally and downwardly preferably through the axis mechanism to a point therebelow, from which point any suitable tubing or other discharge means may be employed to carry the lubricant away from the rotor head.

How the foregoing objects and advantages, together with others which will occur to those skilled in the art, are obtained, will be more apparent from a consideration of the following description making reference to the accompanying drawings which illustrate one embodiment of the invention.

Figure 2 is a vertical sectional view, on a considerably enlarged scale, taken through a portion of the rotor head and illustrating rotor brake and starter parts constructed and arranged in accordance with this invention, the view being taken substantially as indicated by the section line 2—2 on Figure 3;

Figure 3 is a horizontal sectional view, on a somewhat reduced scale, taken substantially as indicated by the section line 3—3 on Figure 2, this view, however, illustrating the major portion of the brake parts in top plan but omitting certain parts for the sake of clarity in the drawings;

Figure 4 is a fragmentary vertical sectional view taken substantially as indicated by the section line 4—4 on Figure 3.

Figure 5 is another detailed sectional view taken as indicated by the section line 5—5 on Figure 2; and Figure 6 is a fragmentary sectional view illustrating a modification.

Figure 1:
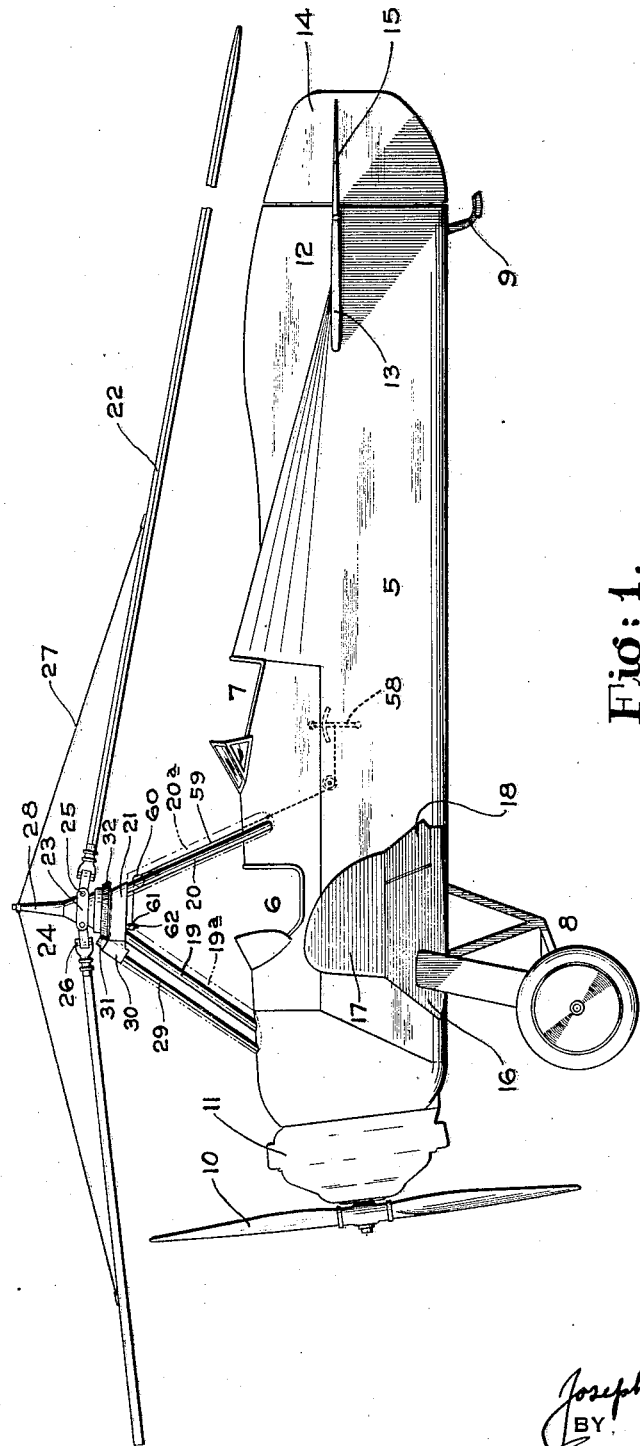
Figure 1 is a somewhat diagrammatic side view of an aircraft of the type above referred to, the view including a somewhat diagrammatic showing of an application of various features of this invention.

In considering the various figures, reference should first be made to Figure 1 in which the body or fuselage of a craft of the type here involved is indicated at 5. The body may be provided with any desired occupant or passenger arrangements, in this instance two cockpits 6 and 7 serving this purpose. The craft is also provided with alighting mechanism including landing gear 8 and a tail skid 9 and, at the forward end of the fuselage 5, the forward propelling means is mounted, this means including a propeller 10 and an engine 11.

The empennage may suitably include substantially fixed vertical and horizontal surfaces 12 and 13 as well as manually controllable vertical and horizontal surfaces 14 and 15. In addition, if desired, supplemental fixed wings 16 having upturned tips 17 may be disposed laterally of the craft at each side of the body 5. These wings 16 may serve as supports for the aileron controls 18.

The sustaining rotor is mounted above the body of the craft, preferably over one of the cockpits, by means of a pylon or mounting structure, preferably composed of a plurality of post or leg elements 19 and 20. In the particular arrangement shown, and in accordance with the copending application of Juan de la Cierva, Serial No. 497,745, filed November 24th, 1930, I have employed a single pylon post element 19 disposed forwardly of the cockpit 6 and extended upwardly substantially midway between the sides of the body of the craft. At the same time, I prefer to utilize two rear post elements 20 extended upwardly from the sides of the craft from points behind the cockpit 6. The three post elements converge upwardly to be secured and interbraced in a pylon apex and strengthening structure 21.

The rotor itself includes a plurality of sustaining blades or wings 22 which are pivotally joined to a central hub member 23 which is supported for free rotation about the axis mechanism, indicated generally at 24, at the top of the rotor pylon. In order that the blades may be free, independently, to assume various positions of equilibrium under the influence of inertia, lift, drag and anti-drag, and other forces, I preferably articulate each blade to the central hub member by means of a horizontally extended pivot pin 25 and a vertical pin 26. In connection with the blades themselves, it should be observed that I may employ any suitable number extended generally radially from the central hub or axis mechanism. I have illustrated only two such blades in Figure 1, but this has been done only for purposes of illustration and clarity in the drawings.

In order to support the blades when they are inactive or rotating at speeds below that which is necessary to support them under the influence of centrifugal force, I may utilize "droop" cables 27 which are extended upwardly from the blades to an upwardly directed mast 28 at the top of the rotor head.

Before considering the more detailed showing of Figures 2 to 4 inclusive, attention is called to the fact that in Figure 1 I have also included portions of a mechanical rotor starting mechanism. For example, a starter shaft 29 is shown as extended upwardly from the body of the craft adjacent the front pylon leg 19. This shaft 29 may suitably be journaled in a box 30 which is carried by the pylon apex 21. At its upper end the shaft 29 carries a pinion 31 which is arranged to mesh with a gear 32, the latter being operatively connected with the rotor hub in a manner which will be more apparent from the following consideration. In this connection, it should be noted that the showing of Figure 1 has been made diagrammatic, at least as to certain portions of the structure, since these parts are shown in detail in Figures 2 to 4 inclusive. Before proceeding further, it should be noted that the starter mechanism herein shown is not a part of this invention per se, but is described and claimed in my application, Serial No. 512,383, filed January 30th, 1931, issued April 30th, 1935 as Patent No. 1,999,636.

Turning now to the more detailed showing particularly of Figure 2, attention is first called to the fact that I have only fragmentarily illustrated the pylon apex structure 21 in this view. This structure is provided with an upwardly extended socket 33 which is adapted to receive the central axis or spindle member 34. The spindle 34 serves as the shaft about which the hub member 23 rotates during normal flight operation, suitable bearings 35 being interposed between the two relatively rotatable axis parts 34 and 23.

As clearly seen in Figure 2 I have provided a downwardly open drum structure 36 secured to the lower edge of the hub member 23 as by means of bolts 37. This drum serves as a support for the gear 32 which, it will be noted, is secured to the outturned flange 38 of the drum as by means of bolts 39. The starter pinion 31 is diagrammatically indicated in Figure 2 to illustrate the manner in which it cooperates with the ring gear 32. In addition to serving as a portion of the driving mechanism for the rotor starter, the drum 36 also cooperates with various brake parts disposed internally thereof, the arrangement being such that the brake reacts through the drum 36 torsionally with respect to the axis thereof and without any tendency toward expansion or spreading of the drum.

The internal brake parts themselves may conveniently be supported and mounted by means of a base structure 40 which has an upstanding sleeve or collar 41 adapted to engage and be positioned by the axis socket 33. The base structure is secured to the pylon apex 21 by means of through bolts 42. Toward the lower portion of the structure 40, its outer cylindrical surface is threaded as indicated at 43 to cooperate with a complementarily threaded annular member 44. This member 44 serves not only as a support for the brake disks themselves, but also as a means of adjustment to take up wear or to control the brake reaction and to complete the closure at the bottom of the drum. This adjustment may be effected by turning the annular member 44 and thus raising or lowering this member with respect to the central and fixed supporting structure. In order to maintain any desired adjustment the threaded surface 43 may be grooved or recessed as indicated, by way of example, at 45 (see lower right-hand corner of Figure 2) to receive a locking pin 46 which is pressed inwardly by spring 47. When it is desired to make an adjustment, therefore, the pin 46 is manually drawn outwardly against the pressure of spring 47 and then the annular member 44 is rotated in the desired direction, after which the pin is again released into a suitable groove 45, it being apparent that such grooves may be multiplied peripherally of the threaded surface 43 in order to provide a positive lock at any suitable intervals.

The braking parts themselves include two sets of annular or plate-like disks, the disks of one set interleaving with those of the other. In the arrangement herein disclosed I have employed four disks 48 which are held or retained as against rotation about the axis of the rotor by means of lugs or lips 49 (see Fig. 3) projecting radially inwardly into sockets formed between opposed outward projections 50 which are carried by the upstanding portion 51 of the brake base or supporting structure 40. The uppermost one of this set of disks is preferably made substantially heavier than the remainder and may also be reenforced as by means of a circular rib or shoulder 52 in order to afford sufficient strength through which the brake control mechanism may operate.

The plates 48, of course, are vertically spaced from each other in order to receive the complementary annular disks 53. These disks are arranged for movement with the brake drum 36 and to this end I preferably secure a plurality of blocks 54 at the inner surface of the cylindrical brake drum wall 55. The outer edges of the plates 53 are suitably recessed to engage the spaced blocks 54.

It will be seen, therefore, that the two sets of interleaving plates are mounted for relative rotational movement when the rotor is rotating and also that all of the plates are arranged with freedom for relative vertical movement, the interengaging extensions or lips 49 and the part 51, and the blocks 54 and recessed circumferences of the plates 53, serving as complementary and interengaging guide-way structures. While I may apply any suitable brake band lining material to plates in either or both of the two sets, I have here shown an arrangement in which the brake lining material 56 is riveted (see rivets 57) or otherwise secured to the set of plates 53 which normally rotate with the drum 36.

In the preferred embodiment and as here shown, the blocks 54 which are carried by the drum 36 are configured in such manner as to permit upward movement of the brake drum without displacing any of the brake plates which normally rotate therewith. In this way, removal of the rotor head and the brake drum is provided for without disturbing the position or adjustment of brake parts.

In considering the structure which I have devised to effect control of the brake, reference should first be made to Figure 1 in which I have diagrammatically illustrated a control lever 58 as being located in the rear cockpit 7. An operating cable or cord 59 is extended upwardly from the control 58 preferably adjacent one of the rear pylon legs 20 to pass over a pulley wheel 60 just below the apex structure 21. The cable 59 extends forwardly from this point to be secured to the operating crank 61 (see Figs. 1 and 2) which is mounted at the lower end of the spindle 62, this spindle being extended upwardly through the apex structure as well as through the brake base 40 in which latter structure a bearing 63 may suitably be provided.

Within the brake unit itself, and at the upper end of the shaft 62, I have provided a pinion 64 meshing with a ring gear 65 which is journaled as at 66 to rotate about the sleeve 41. A ball bearing structure 67 may be employed to vertically support the gear 65. At its upper surface the gear 65 is provided with an undulating cam surface 68 (see Fig. 5) which cooperates with a similar cam surface 69 formed on the annulus 70. In order to prevent rotation of the member 70 when the complementary cam part 65 is rotated (by the brake control), this part (70) is keyed by means of keys 71 to the upstanding sleeve 41 of the brake base or supporting structure.

As will be apparent from inspection of the drawings, however, the keyed arrangement of the part 70, while preventing rotation, provides for freedom of vertical movement in order to actuate the levers 72. Each one of these levers is pivoted as at 73, at a point intermediate its ends, to apertured lugs 74. Each lever, furthermore, is provided with an end 75 projected radially inwardly to overlie the ring 70 and also with an outer end 76 which is adapted to cooperate with the upper surface of the top brake disk 48. Both ends of the levers may, of course, be suitably rounded to ensure smooth action.

The operation of the brake should be quite apparent from the foregoing description but a brief summary of this operation is given herebelow to further clarify the matter.

Upon actuation of the control lever 58, the operating cord 59 is pulled in such manner as to rotate the operating spindle 62. This, of course, turns the pinion 64 which, in its turn, rotates the cam member 65. The cooperating cam surfaces of the members 65 and 70 cause an upward movement of the latter part with the result that the inner ends 75 of the levers 72 are raised. It is also noted, at this point, that the cam actuating mechanism here employed is very desirable since it neatly cooperates with the rotor axis parts and provides relatively great movement of the disks in response to only relatively small deflections of the operating lever 61 and shaft 62. In pivoting about their fulcrums 73, the levers, in turn, result in a downward pressure on the upper brake disk 48. The fact that all of the various brake disks are free to move vertically with respect to each other, permits clamping or gripping of the plates between the adjusting ring 44 and the upper and non-rotatable disk 48.

Upon release of the brake, the two cam parts 65 and 70 of course, may again move closer to each other with the result that the pressure exerted through the levers 72 is relieved. If desired, in order to provide for still further release or freedom for relative brake disk movement, I may interpose (see Fig. 4) coil springs 77 between the stationary disks 48. These springs may conveniently be interposed between the opposed inwardly projecting lips 49.

While I have illustrated an application of brake releasing springs to the stationary disks only in the construction of Figures 1 to 5 inclusive, by reference to Figure 6 it will be seen that I may also readily apply such releasing springs to the brake disks which normally rotate with the rotor.

As here seen, the peripheral wall 84 of the brake drum 85 may be slotted out at intervals to receive outwardly projecting lips 86 of the rotating disks 53a. This complementary slot and lip interengagement of the drum and disks, of course, may be employed in place of the blocks 54 and the complementary recessed portions of the disks 53 in the form of mechanism illustrated particularly in Figures 2 and 3.

Such an arrangement is not only advantageous in providing for an increased brake reaction without enlarging the overall dimensions of the structure, but also in permitting convenient application of releasing springs between the normally rotatable brake disks. As here shown, these springs, as indicated at 87, are interposed between adjacent outwardly projecting lips 86 and also between the bottom disk and a portion of the outturned drum flange 38a. A spring 87 may also be applied above the top brake disk and may suitably react against a surface formed at the upper edge of one of the peripheral slots in the drum and the lower side of a portion of a starter gear 88 which is mounted adjacent the radial or circular wall of the drum 85 and secured thereto as by means of bolts 89 passing through the flange or lip 90.

Where desirable, therefore, I may interpose suitable brake releasing springs between all of the stationary as well as rotating disks, with the result that complete brake release may be provided for.

Turning again to Figure 1, attention is called to the fact that with the brake operating cable 59 extended along a pylon post 20, such cable may conveniently be enclosed within the post streamlining or casing 20a. It might also be mentioned that the forward pylon post 19 and the starter shaft 29 may also conveniently be streamlined as a unit in a casing 19a.

In Figure 2 I have also disclosed a structure which provides for the discharge of any excess or overflow lubricant from the main rotor bearings 35, downwardly into the central annular cavity 91 in which the various brake operating parts are disposed. This cavity is formed between the upright walls 41 and 51 of the base 40 of the brake, and serves as a reservoir for lubricant in which the brake operating parts operate. In the arrangement here shown, a downturned baffle member 80 is carried by the brake drum 36 and cooperates with an annular groove or channel formed in the upstanding sleeve 41 to direct any lubricant overflow downwardly into this channel from which it may suitably be discharged outwardly into the cavity 91. An overflow duct 81 may be formed in the parts 41, 33 and 34 to discharge into the central hollow axis part 34 from which point suitable tubing may be employed to conduct the excess to a point of discharge located well away from the rotor head and preferably below the body of the craft. The excess lubricant, therefore, is kept away from the effective surfaces of the brake disks.

According to the foregoing, the present invention provides for a relatively large braking reaction in a structure which is small in overall dimensions as well as in total weight. At the same time, the various parts are arranged in such manner as to afford adequate protection, particularly of the effective braking surfaces, from moisture, dust and dirt.

The relatively large braking effort obtainable by this construction, of course, is largely resultant from the use of a multiple disk brake unit and it should be observed that this invention provides for convenient and yet simple application of a brake of this type to a structure which heretofore has presented serious problems as to space limitations and mounting arrangements.

In addition to making it possible to utilize a multiple disk brake in the manner just noted, the present invention has gone further and provided an arrangement in which the starter or at least certain driving parts thereof neatly cooperate with a multiple disk brake to maintain the size of the entire rotor head within very small overall dimensions. It might be noted that the utilization of a single member, i. e., the drum 36, through which the starter, as well as one set of disks of the brake, react, is, of course, an important factor in maintaining the desired small overall dimensions.

Since the driving action on the drum is primarily one of torque, and the braking action is torsional and does not impose expansion or contraction forces on the drum, and further, since the drum carries but one of such forces at any one time, the load on the drum and other parts and consequently the weight of said drum and associated parts may be reduced over prior practice.

Attention is also called to the fact that the problems of extending the brake control from a cockpit of the craft to the brake unit itself have been overcome in a convenient and efficient manner by the disposition of brake operating parts internally of a plurality of interleaving annular brake disks. In this way, the brake control is conveniently brought down closely adjacent the center or axis of the rotor at a point which may conveniently cooperate with a cord or cable extended still further downwardly adjacent a pylon post to the body of the craft. The cam operating parts for the brake are also very effective in providing for adequate brake actuation in response to only relatively small movements of the operating member in the cockpit of the craft.

The structure is also of advantage as it permits unitary removal of the rotor head, including the brake enclosing drum, without disturbance of the brake parts themselves. Therefore, at times of inspection, repair, lubrication or the like, the rotor may be removed and replaced without necessitating readjustment of the brake. Additionally, the rotor head and brake enclosing drum need not be removed in order to effect an adjustment of the brake, it being observed that the locking pin 46 is conveniently accessible from a point just below the lower edge of the brake drum.

Finally, when it is desired to inspect, reline or otherwise repair the brake, this may be accomplished by removal of the rotor head which leaves all of the brake parts together as a unit conveniently located for any repairs or the like which may be necessary. The parts of the brake may, of course, be completely re-assembled at the top of the pylon before replacing the rotor and thus their proper positioning is ensured.

What I claim is:—

1. In combination with relatively rotatable structures, a device for braking the relative rotary movement including at least two annular disks arranged coaxially around at least a portion of one of said structures, said disks being mounted for relative movement with said structures, and means for actuating the brake disks including opposed operating members adapted to grip the disks therebetween and cam means operatively reactive between said opposed members to effect gripping of the disks thereby, said cam means including generally annular cooperating cam devices arranged for relative rotation about said portion of one of said structures.

2. For an aircraft having a sustaining rotor and rotor supporting an axis mechanism; a rotor brake structure associated with said mechanism, said brake structure including a brake part rotatable with the rotor, and cooperating brake parts mounted in association with the rotor support, the cooperating brake parts including a supporting device formed to provide a lubricant reservoir, together with brake actuating parts disposed, at least in part, in said reservoir.

3. For an aircraft having a sustaining rotor and rotor supporting and axis mechanism including relatively rotatable members with a bearing therebetween; a rotor brake structure associated with said mechanism, said structure including a brake part rotatable with the rotor, and cooperating brake parts mounted in association with the rotor support, the cooperating brake parts including a supporting device formed to provide a lubricant reservoir, and brake actuating parts disposed, at least in part, in said reservoir, together with means for conducting lubricant overflow or discharge from said bearing into said reservoir.

4. For an aircraft having a sustaining rotor and rotor supporting and axis mechanism including relatively rotatable members with a bearing therebetween; a rotor brake structure associated with said mechanism, said structure including a brake part rotatable with the rotor, and cooperating brake parts mounted in association with the rotor support, the cooperating brake parts including a supporting device formed to provide a lubricant reservoir, and brake actuating parts disposed, at least in part, in said reservoir, together with means for conducting lubricant overflow or discharge from said bearing into said reservoir, and reservoir overflow means arranged to discharge at a point remote from the effective braking surfaces of the cooperating brake parts.

5. For an aircraft having a sustaining rotor with a rotor hub mounted for rotation about a generally upright axis; a downwardly open brake drum rotatable with the hub member, a brake mechanism incorporating a plurality of disks of annular shape nested within the drum, at least one disk being rotatable with the drum and at least one disk being relatively non-rotatably mounted, brake operating means located substantially in the plane of the annulus formed by said disks and positioned internally of the annulus, and rotor drive mechanism including an annular driving element arranged about the drum and secured thereto generally in the plane of said annulus.

6. For an aircraft having a sustaining rotor with relatively rotatable spindle and hub members providing a generally upright axis of rotation for the rotor; a downwardly open brake drum rotatable with the hub member and having its peripheral flange or rim surrounding a portion of the spindle member to form an annular cavity internally defined by the spindle member and externally defined by said rim, a brake mechanism incorporating a plurality of disks of annular shape positioned within said cavity, at least one disk being rotatable with the drum and at least one disk being non-rotatably mounted, brake operating means located substantially in the plane of the annulus formed by said disks and positioned internally thereof around the spindle member, and rotor drive mechanism including an annular driving element arranged about the drum and secured thereto generally in the plane of said annulus.

7. For an aircraft having a sustaining rotor with relatively rotatable spindle and hub members providing a generally upright axis of rotation for the rotor; a downwardly open brake drum rotatable with the hub member and having its peripheral flange or rim surrounding a portion of the spindle member to form an annular cavity internally defined by the spindle member and externally defined by said rim, a brake mechanism incorporating a plurality of disks of annular shape positioned within said cavity, at least one disk engaging said peripheral rim for rotation with the drum and at least one disk being non-rotatably mounted, brake operating means located substantially in the plane of the annulus formed by said disks and positioned internally thereof around the spindle member, and rotor drive mechanism including an annular driving element arranged about the drum and secured to said peripheral rim generally in the plane of said annulus.

JOSEPH S. PECKER.